United States Patent
Kim et al.

(10) Patent No.: US 11,827,005 B2
(45) Date of Patent: Nov. 28, 2023

(54) STRUCTURE APPLYING THE GLASS FIBER-REINFORCED RESIN FOAM HAVING EXCELLENT FATIGUE RESISTANCE AND INSULATING PROPERTIES AND MANUFACTURING METHOD THEREOF

(71) Applicant: Hankuk Carbon Co., Ltd., Gyeongsangnam-do (KR)

(72) Inventors: Jeong Cheol Kim, Gyeongsangnam-do (KR); Min Gyu Kim, Gyeongsangnam-do (KR); Seung Woo Lee, Gyeongsangnam-do (KR); Byeong Min Choi, Buson (KR)

(73) Assignee: Hankuk Carbon Co., Ltd., Gyeongsangnam-do (KR)

( * ) Notice: Subject to any disclaimer, the term of this patent is extended or adjusted under 35 U.S.C. 154(b) by 405 days.

(21) Appl. No.: 16/861,853

(22) Filed: Apr. 29, 2020

(65) Prior Publication Data
US 2020/0254717 A1    Aug. 13, 2020

Related U.S. Application Data

(62) Division of application No. 15/186,661, filed on Jun. 20, 2016, now abandoned.

(30) Foreign Application Priority Data

Apr. 20, 2016    (KR) .......................... 10-2016-0048146

(51) Int. Cl.
*B29C 44/34* (2006.01)
*B32B 5/24* (2006.01)
(Continued)

(52) U.S. Cl.
CPC .......... *B32B 5/245* (2013.01); *B29C 44/1266* (2013.01); *B29C 44/34* (2013.01);
(Continued)

(58) Field of Classification Search
CPC ..................................................... B29C 44/34
See application file for complete search history.

(56) References Cited

U.S. PATENT DOCUMENTS

| 3,591,444 A | 7/1971 | Hoppe |
| 3,900,651 A | 8/1975 | Hoppe |
| | (Continued) | |

FOREIGN PATENT DOCUMENTS

| CN | 104781317 A | 7/2015 |
| JP | S49-083366 U | 7/1974 |
| | (Continued) | |

OTHER PUBLICATIONS

Machine Translation of Japanese Patent 5-138797, Date Unknown.*
Office Action in corresponding India Patent Application No. 201717040833 dated Sep. 16, 2019.

*Primary Examiner* — Jeffry H Aftergut
(74) *Attorney, Agent, or Firm* — Harness, Dickey & Pierce, P.L.C.

(57) ABSTRACT

A method of forming a vehicle sandwich structure composed of a foamed resin article in sheet form forming the core, a fiber-reinforced composite layer forming a surface material that is located on one or both sides of the foamed resin article in thickness direction; forming a binding layer of core and surface materials between the foamed resin article and the fiber-reinforced composite layer; a large number of glass fibers being inserted within said foamed resin article; more than 70% of total glass fibers being the glass fibers which form an angle between the longitudinal direction of each glass fiber and said foamed resin article, the angle of which satisfying a range from 45° to 90°.

8 Claims, 15 Drawing Sheets
(14 of 15 Drawing Sheet(s) Filed in Color)

(51) Int. Cl.
  *B32B 5/20* (2006.01)
  *B32B 5/14* (2006.01)
  *B32B 3/30* (2006.01)
  *B32B 5/08* (2006.01)
  *B29C 44/12* (2006.01)
  *B29C 69/00* (2006.01)
  *B29C 70/44* (2006.01)
  *B29C 70/48* (2006.01)
  *B32B 5/12* (2006.01)
  *B32B 7/04* (2019.01)
  *B32B 27/12* (2006.01)
  *B29L 9/00* (2006.01)
  *B29L 31/30* (2006.01)

(52) U.S. Cl.
  CPC ............ *B29C 69/001* (2013.01); *B29C 70/44* (2013.01); *B29C 70/443* (2013.01); *B29C 70/48* (2013.01); *B32B 3/30* (2013.01); *B32B 5/08* (2013.01); *B32B 5/12* (2013.01); *B32B 5/145* (2013.01); *B32B 5/20* (2013.01); *B32B 7/04* (2013.01); *B32B 27/12* (2013.01); *B29L 2009/00* (2013.01); *B29L 2031/30* (2013.01); *B32B 2250/02* (2013.01); *B32B 2250/03* (2013.01); *B32B 2250/40* (2013.01); *B32B 2260/021* (2013.01); *B32B 2260/046* (2013.01); *B32B 2262/02* (2013.01); *B32B 2262/0261* (2013.01); *B32B 2262/101* (2013.01); *B32B 2262/106* (2013.01); *B32B 2262/14* (2013.01); *B32B 2266/025* (2013.01); *B32B 2266/0228* (2013.01); *B32B 2266/0278* (2013.01); *B32B 2266/0285* (2013.01); *B32B 2305/022* (2013.01); *B32B 2305/08* (2013.01); *B32B 2307/304* (2013.01); *B32B 2307/546* (2013.01); *B32B 2307/552* (2013.01); *B32B 2605/00* (2013.01)

(56) References Cited

U.S. PATENT DOCUMENTS

| | | | |
|---|---|---|---|
| 3,940,524 | A | 2/1976 | Hoppe |
| 4,828,897 | A | 5/1989 | Staneluis et al. |
| 6,042,765 | A | 3/2000 | Sugahara et al. |
| 2005/0074593 | A1* | 4/2005 | Day ................. B32B 5/245 |
| | | | 428/292.1 |
| 2017/0021596 | A1* | 1/2017 | Livesay ............ B32B 5/28 |

FOREIGN PATENT DOCUMENTS

| | | |
|---|---|---|
| JP | S50-38916 B2 | 12/1975 |
| JP | S53-85875 U | 7/1978 |
| JP | S6071243 A | 4/1985 |
| JP | S6219436 A | 1/1987 |
| JP | 3-069317 A * | 3/1991 |
| JP | H03129437 A | 6/1991 |
| JP | 5-138797 A * | 6/1993 |
| JP | H11277662 A | 10/1999 |
| JP | H11300872 A | 11/1999 |
| JP | 2002187232 A | 7/2002 |
| JP | 2004269878 A | 9/2004 |
| JP | 201000065 A | 1/2010 |
| JP | 5034502 B2 | 9/2012 |
| JP | 5368124 B2 | 12/2013 |
| JP | 2014092194 A | 5/2014 |
| KR | 100416834 B1 | 2/2004 |
| KR | 100696188 B1 | 3/2007 |
| KR | 10-2007-0107015 A | 11/2007 |
| KR | 101389178 B1 | 4/2014 |
| KR | 10-2015-0100607 A | 9/2015 |

\* cited by examiner

Figure 1
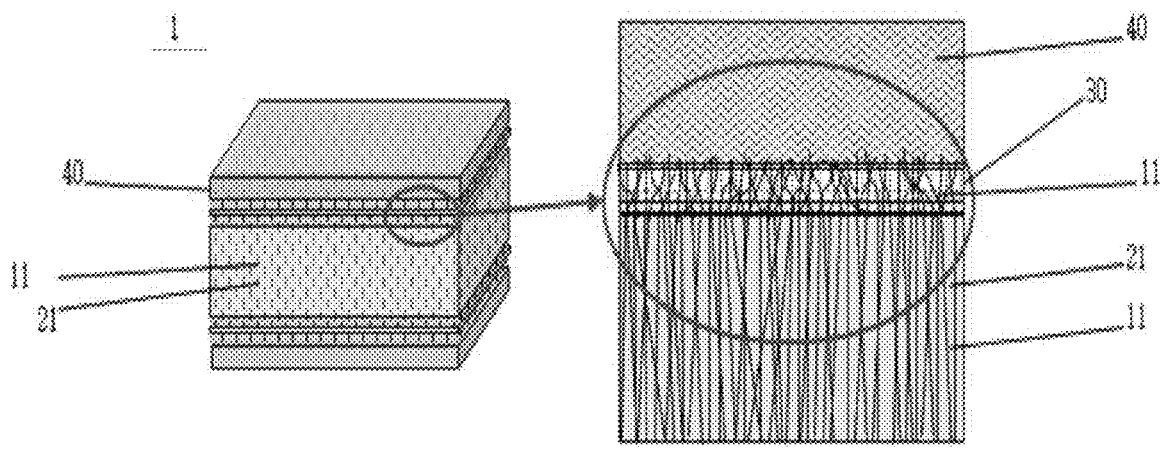
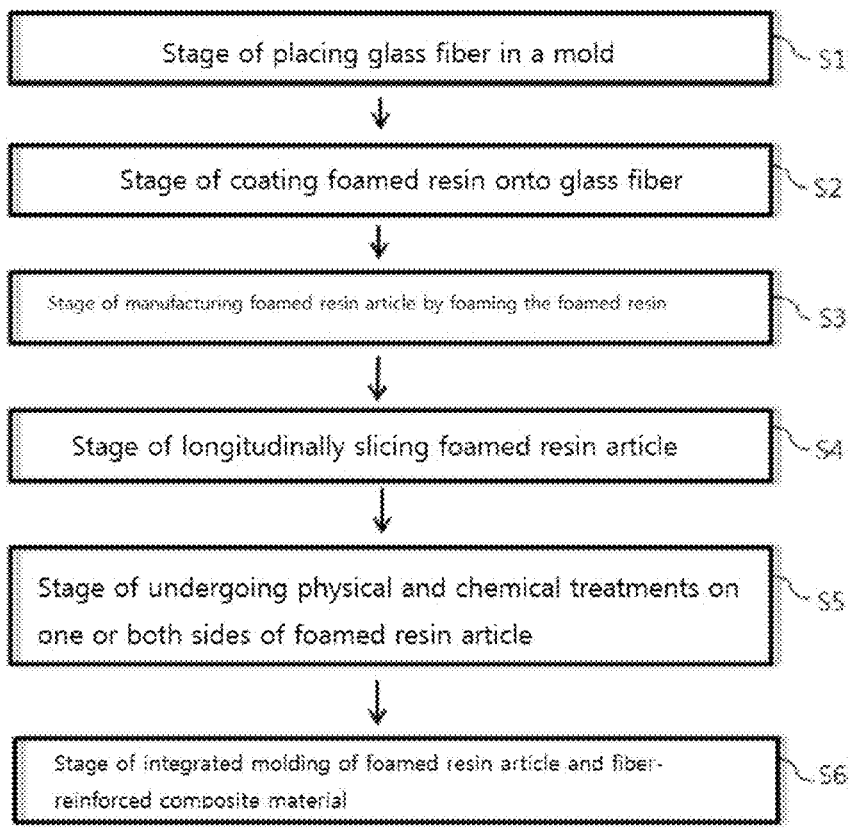

Figure 5
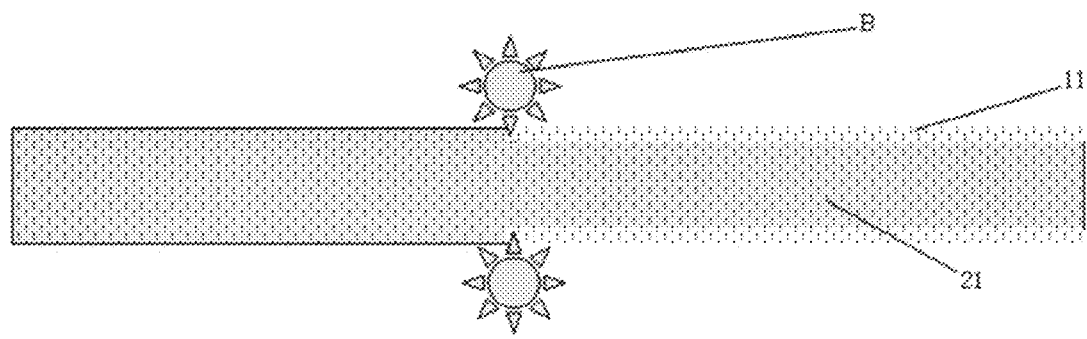
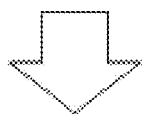
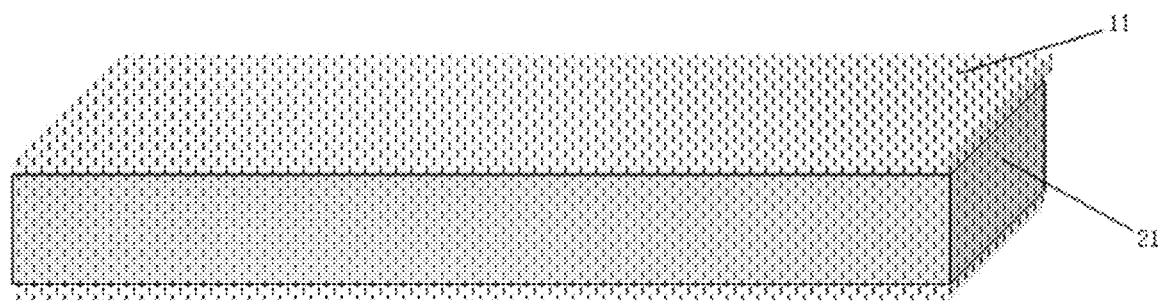

Figure 6
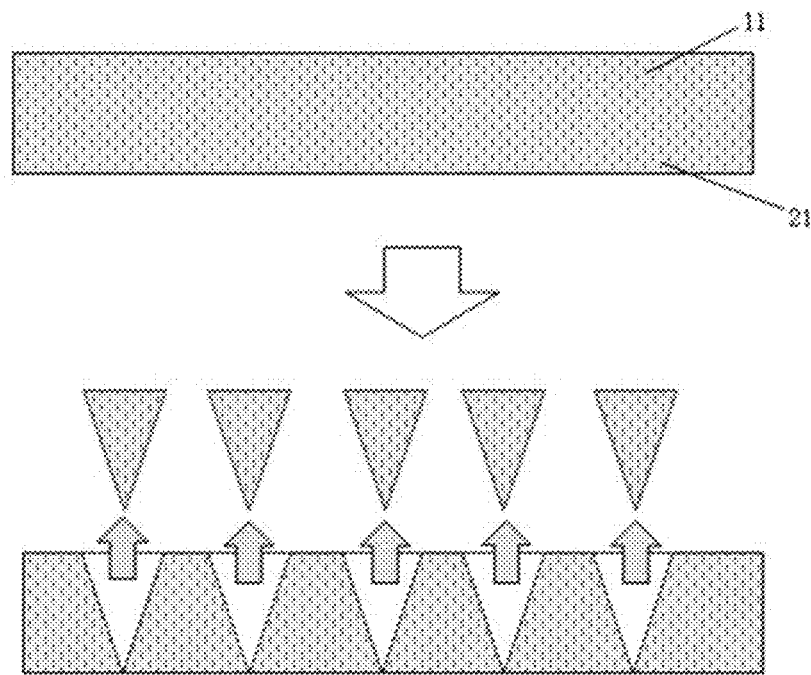
Notch cutting
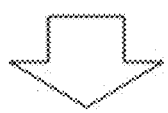
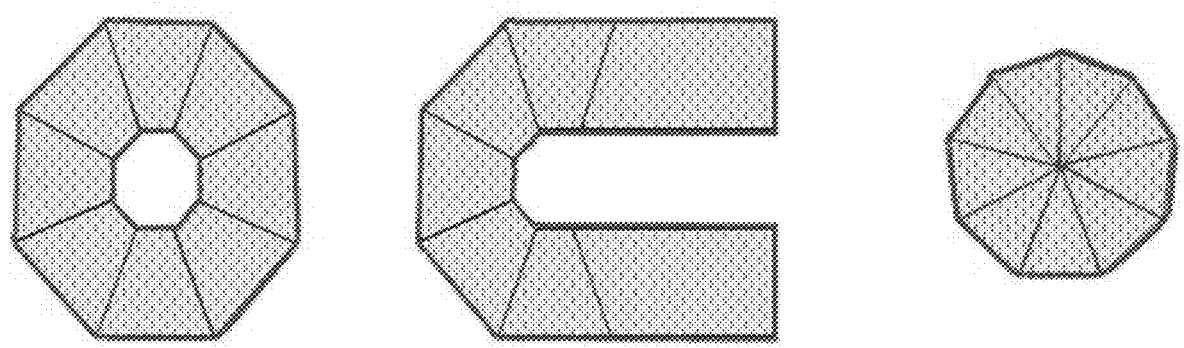

STRUCTURE APPLYING THE GLASS FIBER-REINFORCED RESIN FOAM HAVING EXCELLENT FATIGUE RESISTANCE AND INSULATING PROPERTIES AND MANUFACTURING METHOD THEREOF

CROSS-REFERENCE TO RELATED APPLICATIONS

This application is a divisional of U.S. patent application Ser. No. 15/186,661 filed on Jun. 20, 2016. The entire disclosure of the above application is incorporated herein by reference.

FIELD

The present invention relates to a vehicle structure where to a foamed resin article which includes glass-reinforced fiber is applied and the manufacturing method thereof, more specifically a vehicle structure having excellent fatigue resistance and the manufacturing method thereof, by exposing a glass fiber which is arranged in thickness direction within the foamed resin article at fixed height above the foamed resin article through physical and chemical surface treatments in foamed resin article of core part, and thereby increasing the cohesion between a foamed resin article wherein glass fiber is exposed and a fiber-reinforced composite material, during integrated molding of a foamed resin article wherein glass fiber is exposed and a fiber-reinforced composite material.

BACKGROUND

Generally, a polyurethane foam is a porous material upon which a sponge is made from a polyol and a di-isocyanate, of which there are two types, flexible and rigid. A polyurethane foam of flexible type, is used as cushion materials such as the mattress, and a polyurethane foam of rigid type is used mainly as heat insulators.

Conventionally, in the manufacturing method of a polyurethane foam including a continuous strand mat, an earlier production stage for undiluted solution was performed, so that the reaction rate of NCO/OH, which is the ratio between NCO of an isocyanate and OH of a polyol, was at 1.0-1.4, wherein the following components were mixed together to go through reaction: a polyol component which consisted of 10-30 weight % of polyol which was produced by adding a propylene oxide and an ethylene oxide to an amine, 15-35 weight % of polyol which was produced by adding a propylene oxide and an ethylene oxide to a sucrose, 25-40 weight % of polyol which was produced by adding a propylene oxide and an ethylene oxide to a pentaerythritol, and 10-30 weight % of polyol which was produced by adding a propylene oxide and an ethylene oxide to a glycerin; and an isocyanate component of which the average NCO weight % was 29-32 weight %, using a polymeric MDI of which the number of functional groups was 2.6-3.0.

Thereafter, a continuous strand mat, which is a glass fiber, was impregnated with materials including: a fluorinated carbon-based foaming agent such as water and carboxylic acid etc. or a carbon dioxide; a foaming agent wherein inert gas such as the air was used; an amine-based urethane catalyst such as triethylamine or tripropylamine, triisopropanolamine, tributylamine, etc.; and a polyalkyleneglycol silicone copolymer which is an organic silicone-based compound.

Here, said continuous strand mat was included inside the undiluted solution, by continuously supplying more than 2 arrays of laminates into a conveyer which had an opened upper part, and by infusing uniformly said undiluted solution on the laminates.

Also, the raw materials sprayed on the continuous strand mat were maintained for 30-80 seconds, so as to go through foam reaction.

Here, said continuous strand mat was formed by the cohesion of filaments of less than 25 microns to a solid powder with a polyester or an acryllic binder. As for the consumption of said polyester or acryllic binder, 0.5-3 weight % of strand mat was commonly used so that it was minimized to the extent that the shape of the mat state could be maintained.

On the other hand, KR 10-0416834 disclosed a manufacturing method of a glass fiber-reinforced polyurethane foam including a continuous strand mat, whereby the manufacturing method of a polyurethane foam included: production stage for undiluted solution in which foaming agents, reaction catalysts and other additives were included and reaction was made between polyol components and isocyanate components; manufacturing stage for a polyurethane foam in which a continuous strand mat which is formed by several crossing ciliary glass fibers was added into said undiluted solution. Therein, said continuous strand mat was transferred to said manufacturing stage of polyurethane foam by going through a volume-increasing stage in which cohesion between each ciliary glass fibers was weakened.

On the other hand, KR 10-2013-0004795 developed by the current applicant, 'Hankuk Carbon Co.', disclosed a polyurethane foam which was formed by reaction between a methylene diphenyl diisocyanate (MDI) or a polymeric isocyanate (PMDI) and a synthetic polyol which was produced by selecting at least 5 polyols from the polyol comprised of: a polyol obtained by the addition of propylene oxide and ethylene oxide to an amine; a polyol obtained by the addition of propylene oxide and ethylene oxide to a toluene diamine; a polyol obtained by the condensation reaction of diethylene glycol and dipropylene glycol with terephthalic acid and phthalic acid; a polyol obtained by the condensation reaction of phthalic anhydride and adipic acid with diethylene glycol and dipropylene glycol; a polyol obtained by the addition of propylene oxide and ethylene oxide to a sorbitol; a polyol obtained by the addition of propylene oxide and ethylene oxide to an ethylene diamine; a polyol obtained by the addition of propylene oxide and ethylene oxide to a glycerin.

However, the public patent mentioned above, was focused on the technique which enabled a polyurethane foam to have excellent heat insulation despite small amount of thickness, and thus did not disclose a specific technique which solved the problems of delamination between surface and core materials and decreased tenacity.

In addition, conventionally there was no disclosed technique about flexural fatigue resistance of vehicle structures.

SUMMARY

Technical Problem

The present invention is devised to solve the problems above, and aims to provide a vehicle structure having excellent fatigue resistance and insulating properties by increasing interfacial cohesion between a foamed resin article of core part and a fiber-reinforced composite material which is a surface material.

Technical Solution

In order to achieve the above objective, a vehicle sandwich structure according to the present invention is characterized as follows: being composed of a foamed resin article in sheet form forming the core, a fiber-reinforced composite layer forming a surface material that is located on one or both sides of the foamed resin article in thickness direction; forming a binding layer of core and surface materials between the foamed resin article and the fiber-reinforced composite layer; a large number of glass fibers being inserted within said foamed resin article; more than 70% of total glass fibers being the glass fibers which form an angle between the longitudinal direction of each glass fiber and said foamed resin article, the angle of which satisfying a range from 45° to 90°; the exposed glass fiber being impregnated and bound to the binding layer and the fiber-reinforced composite layer, wherein one or both ends of the glass fiber are exposed on the entire foamed resin article; the height of the exposed portion of said glass fiber being 0.5~10 mm; and flexural fatigue resistance being more than 100,000. In addition, it is characterized by: a reinforced fiber, which is used for said fiber-reinforced composite material, being one or more fibers selected from the group consisting of a glass fiber, a carbon fiber, an aramid fiber, and a synthetic fiber; and said reinforced fiber being in the form of more than one or two types selected from the group consisting of a weaving fabric, a uni-directional fabric, a continuous strand mat, a chopped strand mat, and a bulky mat.

Also, the present invention provides a manufacturing method for a vehicle sandwich structure which comprises the steps of: providing a large number of glass fibers on a mold; spraying the foamed resin onto a large number of said glass fibers; producing a foamed resin article wherein glass fiber is inserted by foaming said foamed resin; slicing said foamed resin article longitudinally so as to give a fixed thicknesses; removing the foamed resin of the end portion of the foamed resin article by undergoing physical or chemical treatments at one or both ends of the above-mentioned sliced foamed resin article; undergoing an integrated molding process of said foamed resin article wherein glass fiber is exposed (core material) and fiber-reinforced composite layer (surface material), so that the fiber-reinforced composite layer is impregnated with the glass fiber which is exposed on said foamed resin article.

According to appropriate examples of the present invention, the form of a glass-reinforced fiber used for manufacturing of said foamed resin article is characterized by being one or more types selected from the group consisting of a continuous strand mat, a chopped strand mat, a bulky mat, a weaving fabric and a uni-directional fabric, and the foamed resin used for manufacturing of said foamed resin article is characterized by being one or more types selected from the group consisting of a polyurethane resin, a polyisocyanurate resin, a polystyrene resin, a polyethylene resin and a phenolic resin. Here, the physical method for removing the foamed resin of one or both ends of said sliced foamed resin article is one type of method selected from the group consisting of a method of adjusting the extent of the cut using cutting devices, and a method of using a brush or a chisel.

Also, the chemical method for removing the foamed resin of one or both ends of said sliced foamed resin article is characterized by undergoing treatments to one or both sides of said sliced foamed resin article with one or more types of organic chemical solvents selected from the group consisting of: a hydrocarbon-based, a halogenated hydrocarbon-based, an alcohol-based, an aldehyde-based, an ether-based, an ester-based, a ketone-based, and a glycol ether-based compound.

In addition, in order to undergo an integrated molding process of said foamed resin article wherein glass fiber is exposed (core material) and fiber-reinforced composite layer (surface material), one type of method is selected from the group consisting of: a method of binding together a foamed resin article (core material) wherein glass fiber is exposed and a fiber-reinforced composite layer with the use of a binder; and a method of infusing the synthetic resin by laminating a fiber-reinforced composite layer to a foamed resin article in which glass fiber is exposed. Here, the method of infusing the synthetic resin by laminating a fiber-reinforced composite layer (surface material) to a foamed resin article in which the glass fiber is exposed (core material) is more than one or two types of method selected from the group consisting of a hand lay-up, a resin transfer molding, an infusion molding, an autoclave molding, a vacuum bag molding, and a press compression molding. And said synthetic resin for integrated molding is more than one or two types of resin selected from the group consisting of an unsaturated polyester resin, a vinyl ester resin, an epoxy resin, a polyurethane resin, a phenolic resin, a polyethylene resin, a nylon resin, a polyacetal resin, a polyvinyl chloride resin, a polystyrene resin and an ABS resin.

In addition, the present invention finely cuts said vehicle sandwich structure or foamed resin article for core materials with the use of notch cutting and provides a vehicle sandwich structure which is manufactured in a curved shape by binding or integrated molding of many of the cut pieces in one type of shape which is selected from the group consisting of a doughnut type (O-shape) and an arched type (⊂-shape).

Advantageous Effects

A vehicle sandwich structure according to the present invention in the configuration as described above has the effect that the cohesion between a foamed resin article of core part and a fiber-reinforced material of surface part is reinforced, and flexural fatigue resistance is improved.

Also, as with a vehicle sandwich structure according to the present invention, a glass fiber inserted into a foamed resin article is arranged in thickness direction, so that flexural maximum load is large, and there is the effect that deflection quantity is small, when loaded.

In addition, a vehicle sandwich structure according to the present invention has the effect of allowing production of a foamed resin vehicle structure with excellent physical properties through a simple manufacturing method of slicing the produced foamed resin articles longitudinally as different from the conventional method.

DRAWINGS

The patent or application file contains at least one drawing executed in color. Copies of this patent or patent application publication with color drawing(s) will be provided by the Office upon request and payment of the necessary fee.

FIG. 1 is a cross-sectional view which illustrates an example of a vehicle sandwich structure according to the present invention.

FIG. 2 is a view of the manufacturing method which illustrates an example of the manufacturing method of a vehicle sandwich structure according to the present invention.

FIG. 5 is a cross-sectional view of manufacturing method of physical treatments which illustrates stage S5 of the manufacturing method of a vehicle sandwich structure according to the present invention.

FIG. 6 is a view of the manufacturing method which illustrates the manufacturing process of a vehicle sandwich structure or a foamed resin article for core materials according to the present invention in a curved shape of doughnut type, arched type, or circular type according to each uses.

DETAILED DESCRIPTION

With reference to the attached drawings for preferred examples of the invention, description will be made in more details.

Figure 7:
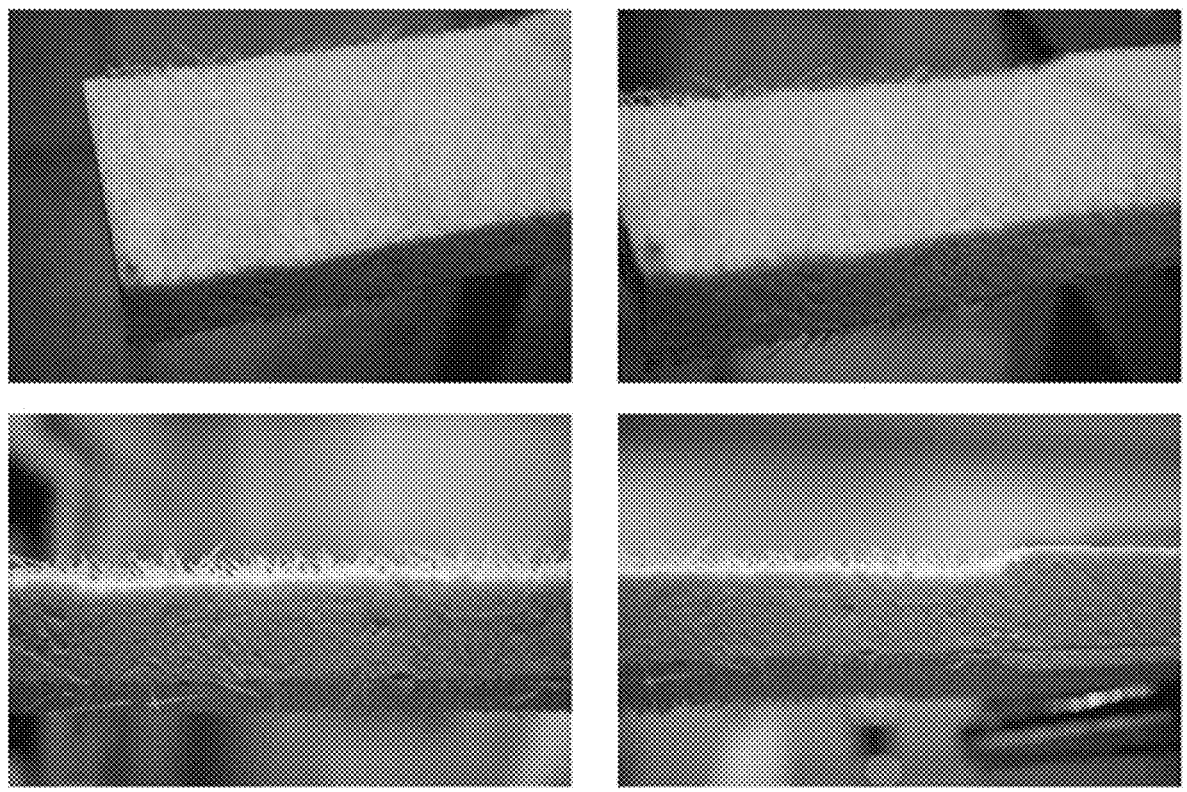
FIG. 7 is a photograph of a resin foam wherein glass fiber is exposed in vertical direction according to the present invention.
Figure 8A:
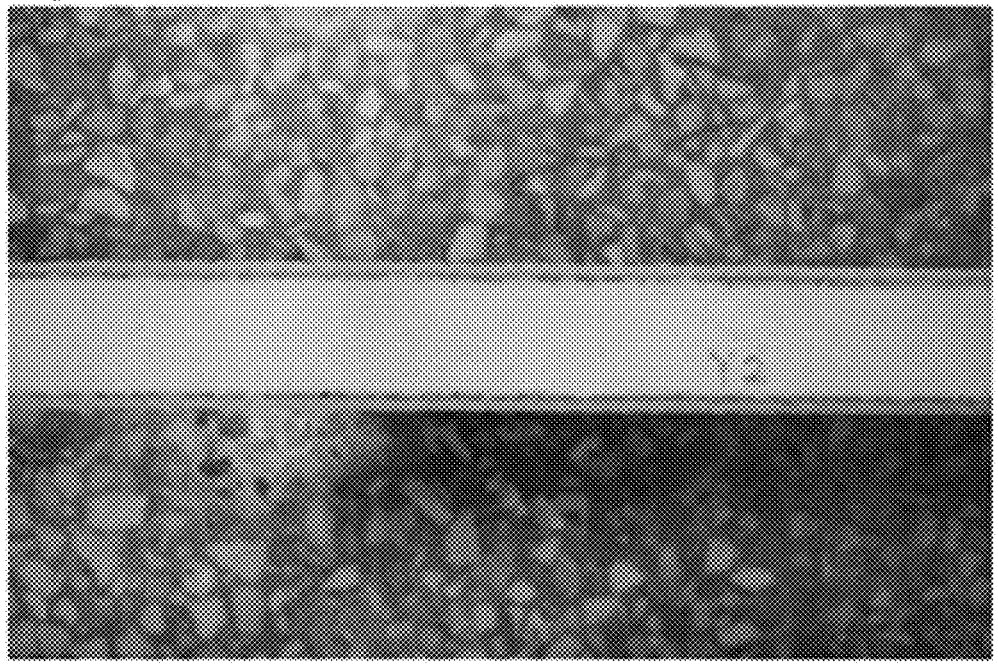
FIGS. 8a through 8e are photographs comparing cross-sectional views of each panels which are manufactured according to examples and comparative examples.
Figure 8B:
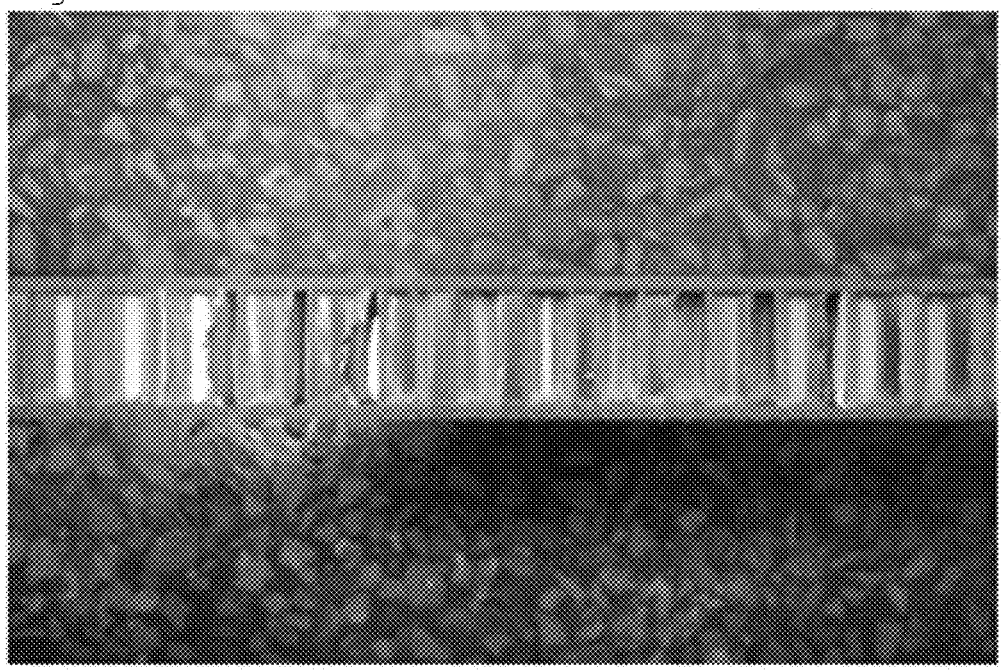
Figure 8C:
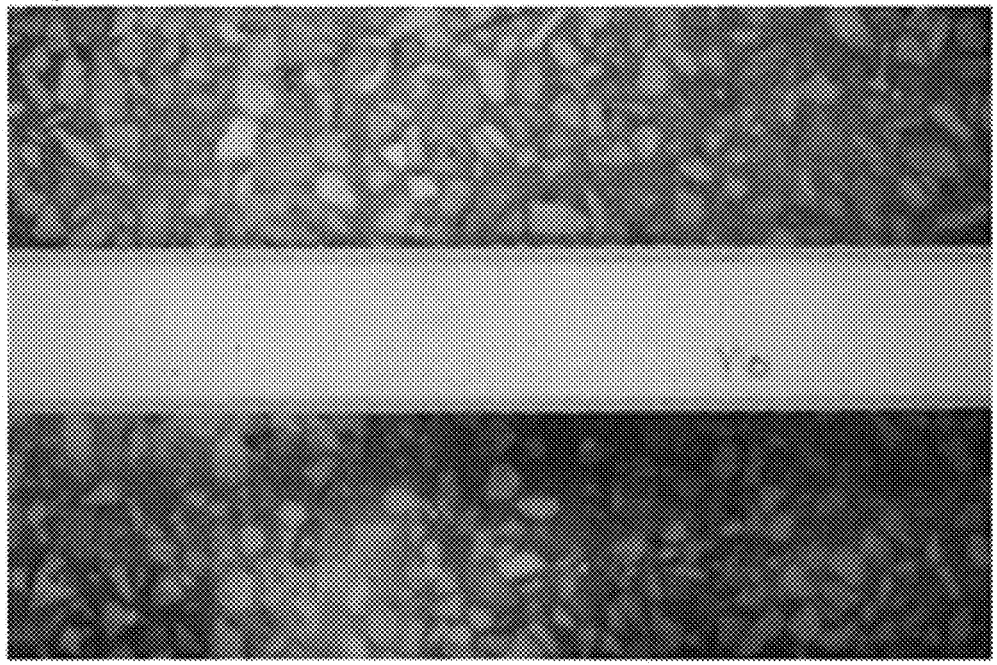
Figure 8D:
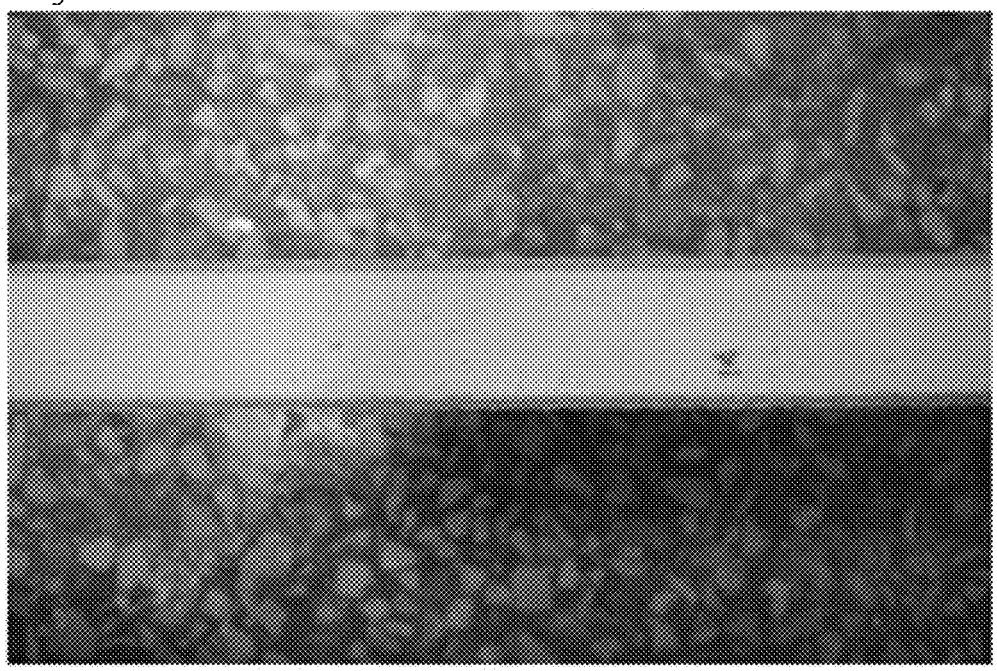
Figure 8E:
Figure 9A:
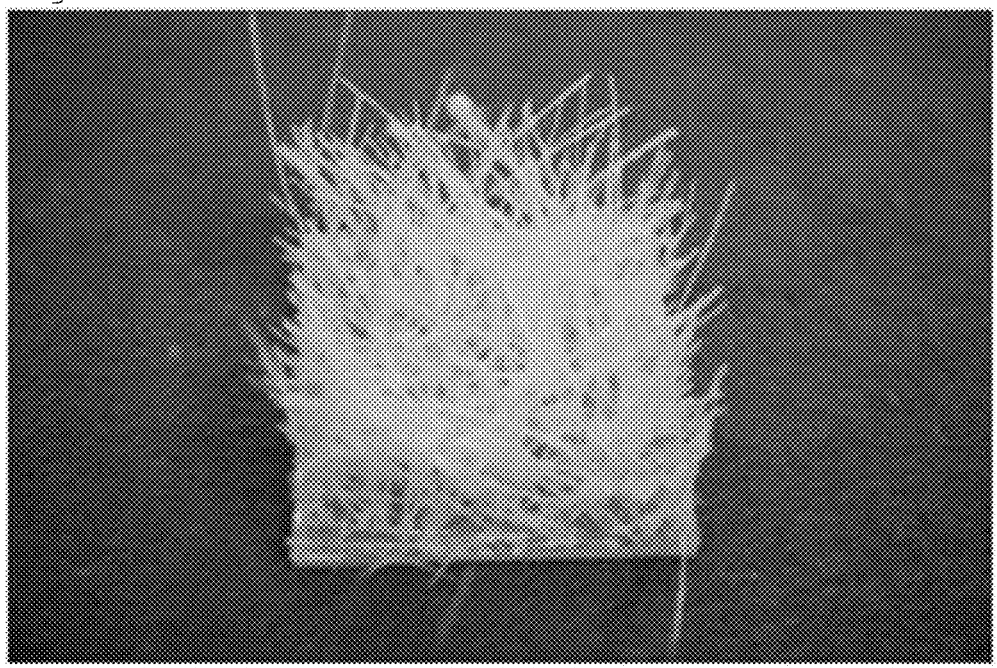
FIGS. 9a through 9e are photographs comparing shapes in which each panels are bound with an interface, the panels being manufactured according to examples and comparative examples.
Figure 9B:
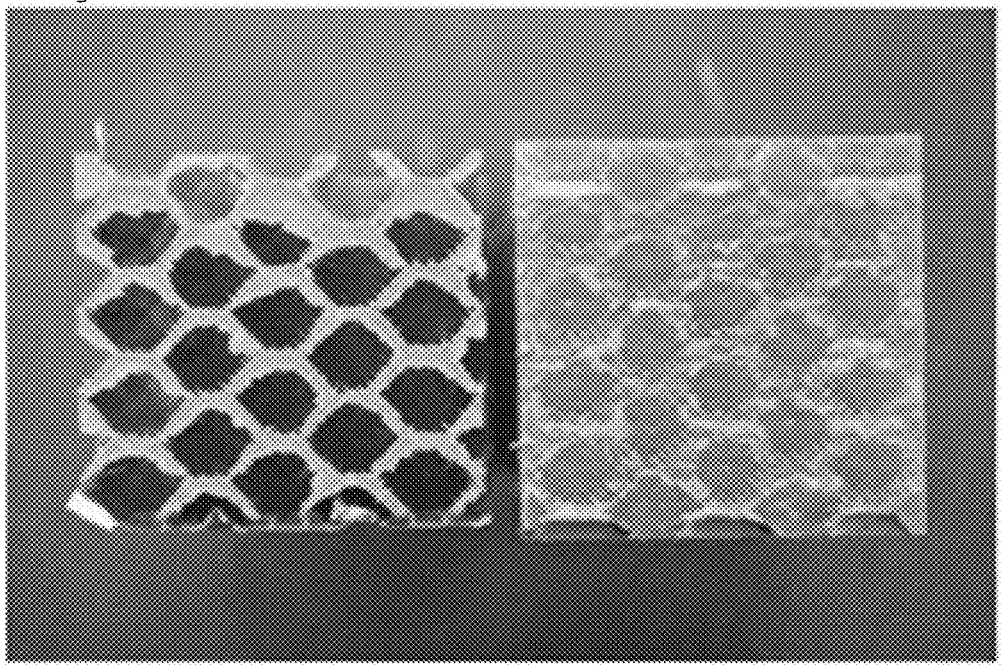
Figure 9C:
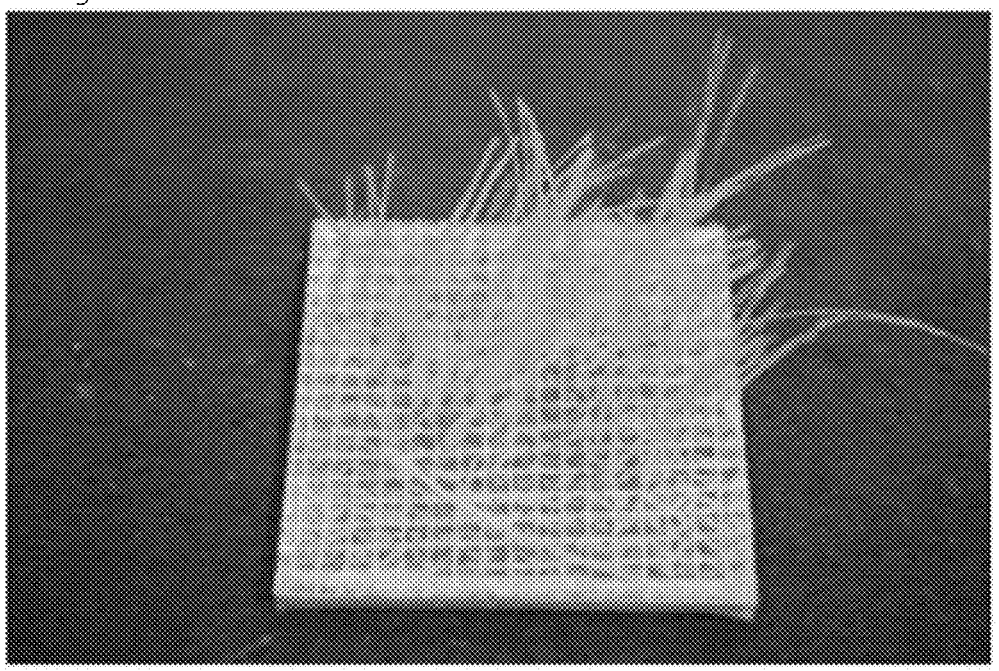
Figure 9D:
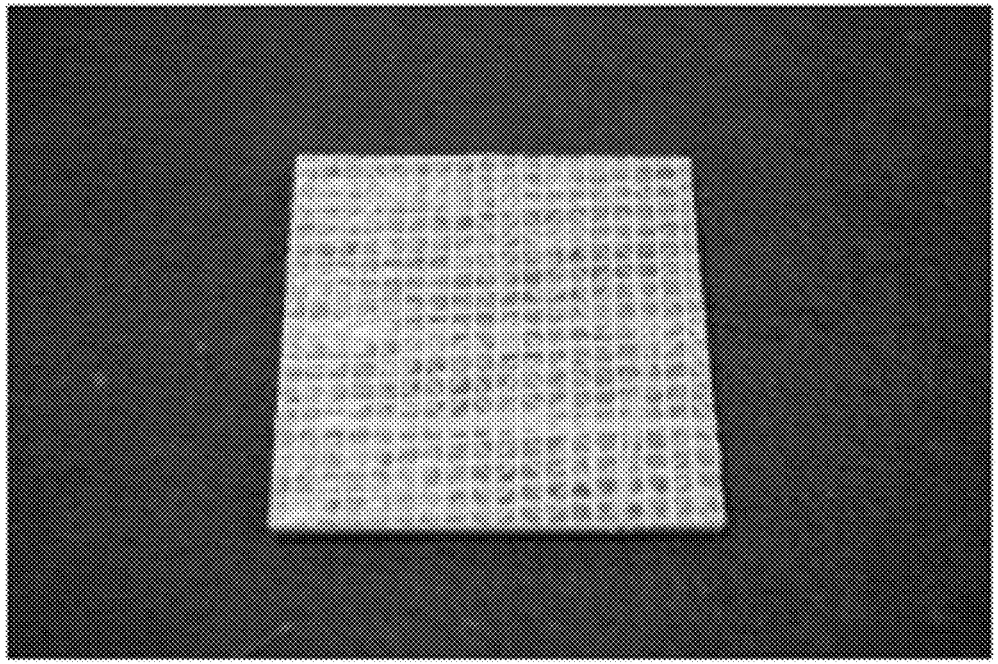
Figure 9E:
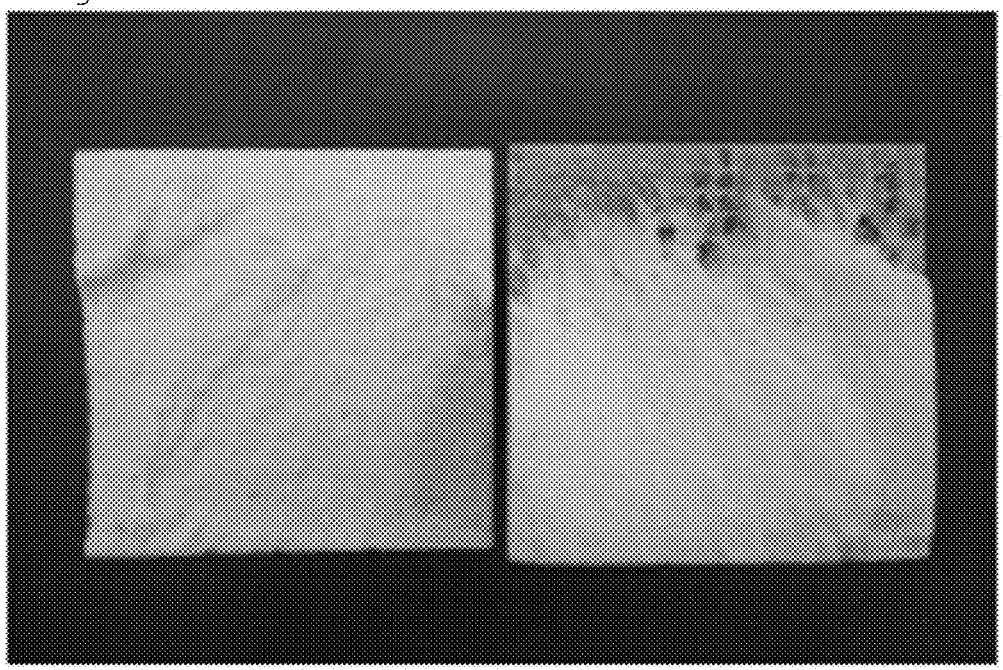

FIG. 1 is a cross-sectional perspective view which illustrates an example of a vehicle sandwich structure according to the present invention, and FIG. 7 is a photograph of a resin foam wherein glass fiber is exposed in vertical direction according to the present invention.

Referring to FIG. 1 and FIG. 7, a vehicle sandwich structure according to the present invention may include: a foamed resin article in sheet form (core material); a large number of glass fibers which are formed in said foamed resin article; a core material which is formed on the outer surface of a foamed resin article; and a fiber-reinforced composite material (surface material) which is formed on the outer surface of a binding layer of the surface material and the outer surface of said binding layer. Also, when a glass fiber, which is inserted into a foamed resin article, is exposed above the entire foamed resin article, and the exposed glass fiber is impregnated with said binding layer and fiber-reinforced composite layer, the cohesion between a foamed resin article (core material) and a fiber-reinforced composite layer (surface material) is enhanced, and heat insulation and flexural fatigue resistance are improved, so that it may be used as interior and exterior materials of vehicles, such as buses and passenger cars, etc.

A foamed resin article according to the present invention is the foam formed by mixing a foaming agent with a foamed resin, for example, polystyrene, polyethylene, polyurethane, and phenol, etc.

A polyurethane foam among said foamed resin articles undergoes a foam molding process with a polyol, a polyisocyanate and a foaming agent, etc. as the main raw material, thus is appropriate for use as heat insulators due to excellent heat insulation, molding properties and workability.

A large number of glass fibers according to the present invention is formed by being inserted into said foamed resin article, and play the role of improving physical properties of the foamed resin article.

For example, in terms of deflection quantity for the flexural maximum load and the load, a foamed resin vehicle sandwich structure of the present invention wherein glass fiber is inserted in thickness direction is superior in comparison with a polyurethane foam that has been arranged in horizontal direction and a polyurethane foam without a glass fiber.

Meanwhile, a glass fiber according to the present invention is characterized by having an average orientation direction of a thickness direction.

When explained according to coordinates, a large number of said glass fibers, as for a foamed resin article in sheet form located on the xy-plane and having a thickness in the z-axis direction, has an average orientation direction which is arranged in the z-axis direction. Here, orientation direction is the degree to which it is made to stand in thickness direction (z-axis) as to the length direction (xy-axis) of said foamed resin article.

Specifically, in order to calculate the average orientation degree of each glass fibers, when any of the 10 pieces of glass fiber is selected, and when the magnitude of the angle between the selected glass fiber and the length direction of said foamed resin article (xy-axis) is measured, the number of glass fibers, of which each measured angle is above 45° and below 90°, is counted, and the average orientation degree of the glass fiber is derived therefrom. For example, if eight of the glass fibers from the selected 10 glass fibers meet the above conditions, the average orientation degree is defined as 80%.

In a vehicle sandwich structure according to the present invention, the orientation degree of a glass fiber is defined as above 70%, if derived in the above manner. However, it should be noted that each of the glass fibers is not formed in a rod-shape wherein the angle can be accurately measured, instead it is somewhat randomly flexed.

If the orientation degree of a glass fiber derived by the above method is less than 70%, there is the problem that physical properties of flexural maximum load are not good enough.

Because a glass fiber is arranged in thickness direction instead of length direction, physical properties, such as flexural maximum load and deflection quantity for the load, increases significantly.

On the other hand, a vehicle sandwich structure according to the present invention is characterized by a large number of glass fibers being exposed on the surface of a resin article foam, by eliminating the foamed resins placed near the surface of the foamed resin articles which fill in the gap between the glass fibers through physical and chemical treatments on the surface of the resin article foam.

As illustrated in FIG. 1, during integrated molding of surface material and core material by a glass fiber exposed at a fixed height on the surface of the resin article foam, there is the advantage that the cohesion between surface material and core material of the sandwich structure is increased, by the penetration of exposed fibers into a fiber-reinforced composite material, which is a surface material.

It is desirable that the height of the exposed part of said glass fiber is in a range from 0.5 mm to 10 mm. When the height of said exposed part is smaller than 0.5 mm, interfacial cohesion between core material and surface material weakens, and when above 10 mm, workability decreases.

A vehicle sandwich structure according to the present invention is characterized by having flexural fatigue resistance (ASTM C393) of more than 100,000 cycles (3 HZ, 423 kgf), interlayer cohesion of more than 3 MPa (ASTM C297), flexural maximum load of more than 500 kgf (ASTM C393). In comparison with the conventional sandwich structures, flexural fatigue resistance improves more than double the amount, interlayer cohesion also improves more than double, so that there is an excellent effect on the delamination between surface material and core material and tenacity decreases.

However, a fiber-reinforced composite layer according to the present invention is more than one or two kinds of fiber selected from the group consisting of a glass fiber, a carbon fiber, an aramid fiber, and a synthetic fiber, and the form of said reinforced fiber is more than one or two types selected from the group consisting of a weaving fabric, a uni-directional fabric, a continuous strand mat, a chopped strand mat and a bulky mat.

And the binding layer of a vehicle sandwich structure according to the present invention is formed on the outer surface of said foamed resin article, into which a synthetic resin is infused, while the synthetic resin is more than one or two kinds selected from the group consisting of an unsaturated polyester resin, a vinyl ester resin, an epoxy resin, a polyurethane resin, a phenolic resin, a polyethylene resin, a nylon resin, a polyacetal resin, a polyvinyl chloride resin, a polystyrene resin and an ABS resin.

Hereinafter, a manufacturing method of a vehicle sandwich structure according to the present invention will be explained in detail with reference to the attached drawings.

Figure 3A:
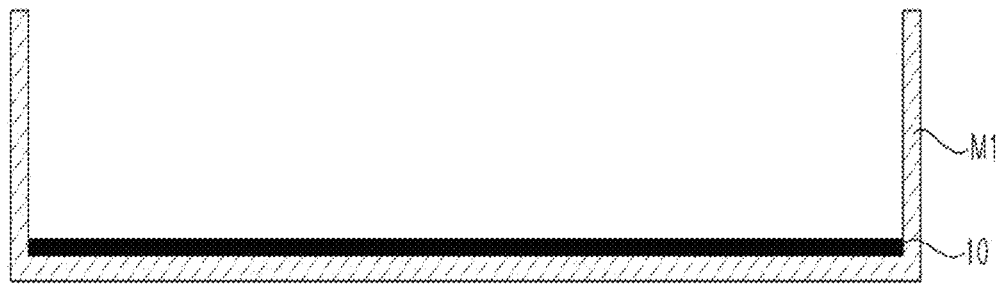
FIG. 3a through FIG. 3d are cross-sectional views of manufacturing method which illustrate stages S1 through S3 of the manufacturing method of a vehicle sandwich structure according to the present invention.
Figure 3B:
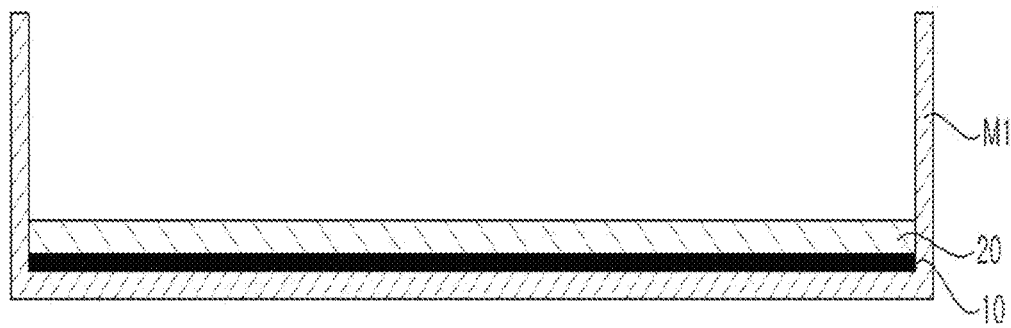
Figure 3C:
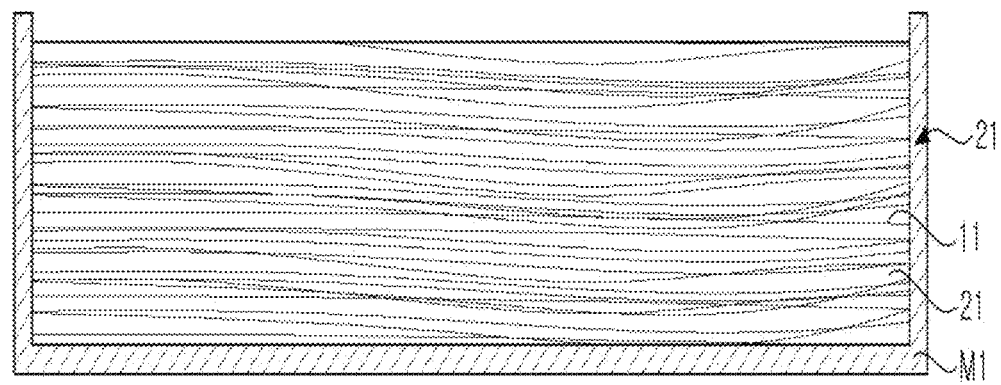
Figure 3D:
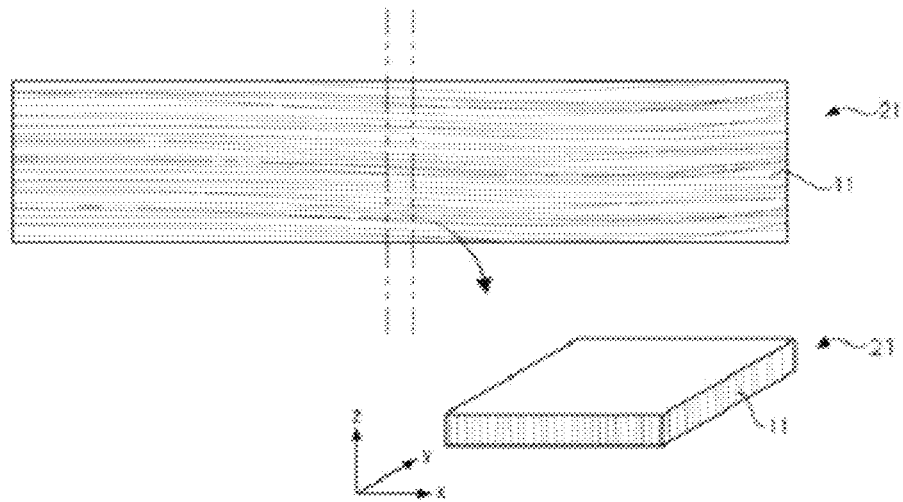
Figure 4:
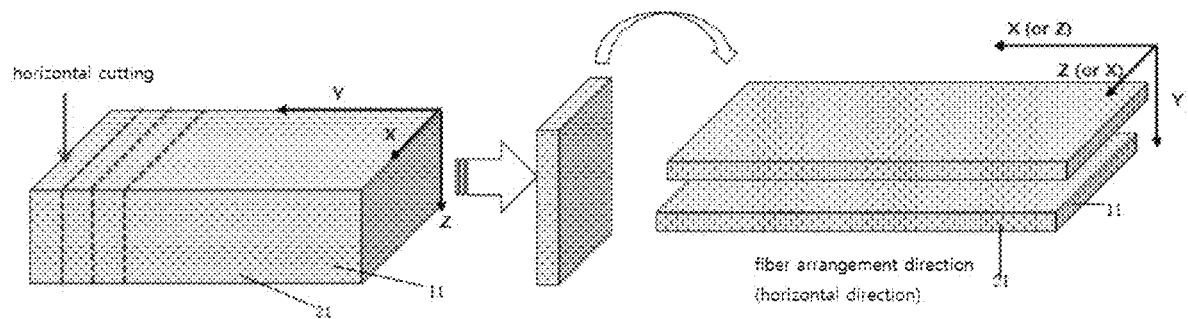
FIG. 4 is a cross-sectional view of manufacturing method which illustrates stage S4 of the manufacturing method of a vehicle sandwich structure according to the present invention.

FIG. 2 is a view of the manufacturing method which illustrates an example of the manufacturing method of a vehicle sandwich structure according to the present invention, FIG. 3 is a cross-sectional view of manufacturing method which illustrates stages S1 through S3 of the manufacturing method of a vehicle sandwich structure according to the present invention, FIG. 4 is a cross-sectional view of manufacturing method which illustrates stage S4 of the manufacturing method of a vehicle sandwich structure according to the present invention, FIG. 5 is a cross-sectional view of manufacturing method of physical treatments which illustrates stage S5 of the manufacturing method of a vehicle sandwich structure according to the present invention.

Referring to FIG. 2 through FIG. 5, a manufacturing method of a vehicle sandwich structure according to the present invention may include the steps of: providing a large number of glass fibers on a mold (S1); spraying the foamed resin onto a large number of said glass fibers (S2); producing a foamed resin article wherein glass fiber is inserted by foaming said foamed resin (S3) and slicing said foamed resin article longitudinally so as to give fixed thicknesses (S4); exposing the glass fiber above the foamed resin article by removing the foamed resin of the end portion of the foamed resin article by undergoing physical or chemical treatments at one or both ends of said sliced foamed resin article (S5); undergoing an integrated molding process of said foamed resin article wherein glass fiber is exposed (core material) and the fiber-reinforced composite layer (surface material), so that the fiber-reinforced composite layer is impregnated with the glass fiber which is exposed above said foamed resin article (S6).

A glass fiber of said stage S1 is a glass-reinforced fiber, the form of which is more than one or two types selected from the group consisting of a continuous strand mat, a chopped strand mat, a bulky mat, a weaving fabric, and a uni-directional fabric, and it is desirable to give an example of a glass continuous strand mat (10) composed of a glass continuous fiber (refer to FIGS. 3a, 3b).

An example for said glass continuous fiber is a strand which is formed by unification of 100 to 30,000 monofilaments each of which having a diameter from 3 μm to 30 μm, and is in a non-twisted or a little twisted state. And in an example of a glass continuous strand mat, the strand count of 1 strand ranges from 50 to 2,000 tex.

As another example, a glass chopped fiber, which is cut in a fixed length of 5~10 cm from a glass yarn of 9~13 μm or a roving of 10~24 μm, can be used as well.

But in the case of a glass chopped fiber, there is the problem of difficulty to control its orientation or directionality. This is because a glass chopped fiber cannot be arranged in the wanted direction during which a foamed resin undergoes foaming, due to its freer movement compared with a continuous fiber.

On the contrary, a glass continuous fiber has the advantage that it can maintain its orientation in the length (horizontally) direction during a foaming state in which it is placed at the bottom of a mold because it is continuously extended.

On the other hand, said glass fiber (11) is spread in thickness direction while a foamed resin (20) undergoes foaming in said stage S3. In other words, the glass fiber (11), which is inserted into a foamed resin article (21), becomes uniformly distributed from top to bottom when foaming is completed, because glass fibers which are crowded in the lower part of the mold (M1) floats to the upper part due to the stress from the foamed resin as it undergoes foaming process.

A foamed resin for manufacturing a foamed resin article is more than one or two kinds of resins selected from the group consisting of a polyurethane resin, a polyisocyanurate resin, a polystyrene resin, a polyethylene resin and a phenolic resin.

In said stage S4, a foamed resin article is sliced longitudinally, so that a glass fiber is arranged in thickness direction of the sliced foamed resin article (refer to FIG. 4).

In said stage S5, a glass fiber in a foamed resin article is exposed above the surface of the foamed resin article by undergoing physical or chemical treatments on the surface of the foamed resin article.

In the physical treatment herein, the surface of the foamed resin article may be cut by adjusting the extent of the cut using cutting devices (saw, knife, wheel) which are used for slicing foamed resin articles, or, as illustrated in FIG. 5, a foamed resin placed on the surface of a foamed resin article may be removed with the use of a brush or a chisel on the surface of the foamed resin article (refer to FIG. 5).

Also, in the chemical treatment, a foamed resin on the surface of a foamed resin article is removed by using one or more types of organic chemical solvents selected from the group consisting of a hydrocarbon-based, a halogenated hydrocarbon-based, an alcohol-based, an aldehyde-based, an ether-based, an ester-based, a ketone-based, and a glycol ether-based compound, on one or both sides of said foamed resin article.

And in said stage S6, a fiber-reinforced composite material is laminated with one or both sides of a foamed resin article wherein glass fiber is exposed (core material), and said foamed resin article and fiber-reinforced composite material undergo an integrated molding process by using a binder or by inserting a synthetic resin, the examples of which are an unsaturated polyester resin, a vinyl ester resin, an epoxy resin, a polyurethane resin, a phenolic resin, a polyethylene resin, a nylon resin, a polyacetal resin, a polyvinyl chloride resin, a polystyrene resin and an ABS resin.

And, as for the method of infusing a synthetic resin in order to bind together said foamed resin wherein glass fiber is exposed (core material) with fiber-reinforced composite material (surface material), it is desirable to use more than one or two methods selected from the group consisting of a hand lay-up, a resin transfer molding, an infusion molding, an autoclave molding, a vacuum bag molding, and a press compression molding.

A vehicle sandwich structure or a foamed resin article for core materials which are manufactured according to the above method, may be produced in a curved shape of a doughnut type (O-shape), an arched type (⊂-shape), or a circular type. FIG. 6 is a view of the manufacturing method which illustrates the manufacturing process of a vehicle sandwich structure in a curved shape. With reference to FIG. 6, it is illustrated that a vehicle sandwich structure can be finely cut into many pieces by notch cutting, each of which may be produced in a curved shape by binding together or arranging in a doughnut type (O-shape), an arched type (⊂-shape), or a circular shape. Also, it is illustrated that a foamed resin article for core materials can be finely cut into many pieces, each of which may be produced in a curved shape by binding them together in a doughnut type (O-shape), an arched type (⊂-shape), or a circular shape, thereafter undergoing integrated molding with a fiber-reinforced composite material which is a surface material, so that they may be produced as a vehicle sandwich structure in a curved shape of a doughnut type (O-shape), an arched type (⊂-shape), or a circular shape, according to each uses.

There is the advantage that by manufacturing of a vehicle sandwich structure or a foamed resin article for core materials, a vehicle sandwich structure which may take various forms according to various uses may be produced.

In the following, through the preferred examples, a vehicle sandwich structure and the manufacturing method thereof according to the present invention will be described in more detail.

Example

1. Stages S1 and S2

FIGS. 3a, 3b are cross-sectional views of manufacturing method which illustrate stages S1 through S2 of the manufacturing method of a vehicle sandwich structure according to the present invention. With reference to FIGS. 3a, 3b, a GCSM (Glass Continuous Strand Mat) composed of glass continuous fibers is placed on a mold and a polyurethane is sprayed onto said GCSM.

2. Stage S3

FIG. 3c is a cross-sectional view of manufacturing method which illustrates stage S3 of the manufacturing method of a vehicle sandwich structure according to the present invention. With reference to FIG. 3c, a foamed resin article is produced by foaming a polyurethane through reaction between a polyurethane foamed on said GCSM and given foaming agent.

3. Stage S4

FIG. 4 is a cross-sectional view of manufacturing method which illustrates stage S4 of the manufacturing method of a vehicle sandwich structure according to the present invention. With reference to FIG. 4, the manufactured foamed resin article is sliced longitudinally at the width of 30 mm.

4. Stage S5

FIG. 5 is a cross-sectional view of manufacturing method of physical treatments which illustrates stage S5 of the manufacturing method of a vehicle sandwich structure according to the present invention. With reference to FIG. 5, a glass fiber is exposed on the surface of a resin foam at an average of 2 mm, by eliminating a foamed resin of the resin foam with the use of a cutting device or a rotating brush, so that the glass fiber is exposed above the surface of the produced resin foam.

5. Stage S6

A manufacturing process of a vehicle sandwich structure with the thickness of 36 mm is completed by laminating a glass mesh, the ends of which is exposed above a foamed resin article, and a glass fabric for fiber-reinforced composite materials on both sides of a foamed resin article wherein glass fiber is exposed (core material), and by undergoing integrated molding with a vinyl ester resin. Its physical properties are listed in the following table 1.

Comparative Example 1

Instead of applying a resin article foam in the core material, a vehicle sandwich structure is manufactured in the same method as S6 stage of said example 1, by applying the Al Honeycomb core which is used as a core material (core) of the conventional vehicle sandwich structure (Core size of ⅜ inches, Al thickness of 70 μm), its physical properties being listed in the following table 1.

Comparative Example 2

Except for a manufacturing process of physical and chemical treatments on the surface of a resin article foam by skipping Stage S5, a vehicle sandwich structure is manufactured in the same method as said example 1, its physical properties being listed in the following table 1.

Comparative Example 3

A glass fiber is arranged in length (horizontal) direction by slicing a manufactured foamed resin article in a lateral direction. Thereafter, a manufacturing process of a vehicle sandwich structure with the thickness of 36 mm is completed by laminating a glass fiber for fiber-reinforced composites on both sides of said sliced foamed resin article, and undergoing integrated molding with a vinyl ester resin, its physical properties being listed in the following table 1.

Comparative Example 4

After skipping stages S1 and S2, a polyurethane only is foamed without a GCSM (glass fiber), said foamed resin is sliced. A glass fiber for fiber-reinforced composites is laminated on both sides of said sliced foamed resin, and it undergoes integrated molding with a vinyl ester resin, so that the manufacturing process of a vehicle sandwich structure with the thickness of 36 mm is completed, its physical properties being listed in the following table 1.

Cross-sectional views of sandwich structures which are manufactured according to examples and comparative examples are illustrated in FIG. 8a through 8e.

Method for Evaluating Physical Properties (a) Compressive Maximum Strength

The compressive maximum strength is a measurement of strength by compressing 10% of foaming sample height in a vertical or horizontal direction in relation to the foaming direction. Compressive maximum strength=compressive strength (load)/cross-sectional area, and it was measured by ASTM D1621.

(b) Cohesion Between Layers

The cohesion between layers is an experiment whereby cutting off is done in the tensile direction after cohesion with a loading block in vertical or horizontal direction in relation to the foaming direction. Cohesion between layers=cohesion (load)/cross-sectional area, and it was measured by ASTM C297.

(c) Flexural Maximum Load

The flexural maximum load is a measurement of maximum load until fracture occurs by carrying out a bending experiment in the laminating direction of a sandwich structure, and it was measured by ASTM C393.

(d) Flexural Maximum Displacement

The flexural maximum displacement is a measurement of maximum drawing until fracture occurs by carrying out a bending experiment in the laminating direction of a sandwich structure, and it was measured by ASTM C393.

(e) Flexural Fatigue Resistance

The flexural fatigue resistance experiment is based on ASTM C393 experiment, and shows the repeated number of experiments which are carried out until fracture occurs by repetitively adding power at the load of 90% of maximum load of the standard sample.

(f) Heat Insulation

The heat insulation is a measurement of thermal conductivity of an object, and the thermal conductivity of the materials is measured by using a heat flux meter method. The thermal conductivity is measured with the use of a heat flux sensor, by putting in materials between high temperature and low temperature plates by a standard of ASTM C518.

TABLE 1

| Classification | Example | Comparative Example1 | Comparative Example2 | Comparative Example3 | Comparative Example4 |
|---|---|---|---|---|---|
| Thickness (mm) | 36 | 36 | 36 | 36 | 36 |
| Compressive Strength (MPa) | 2.23 | 1.97 | 2.32 | 1.33 | 1.11 |
| Cohesion between layers (MPa) | 3.29 | 1.40 | 1.38 | 0.81 | 0.98 |
| Flexural maximum load (kgf) | 514.8 | 469.8 | 503.8 | 386.1 | 373.1 |
| Flexural maximum displacement (mm) | 13.39 | 5.94 | 12.11 | 20.17 | 21.96 |

TABLE 1-continued

| Classification | Example | Comparative Example1 | Comparative Example2 | Comparative Example3 | Comparative Example4 |
|---|---|---|---|---|---|
| Flexural fatigue resistance (Cycle) (3 Hz, 423 kgf load) | 107,587 | 1,999 | 46,926 | 0 | 0 |
| Heat insulation (W/mk) | 0.0296 | 0.5446 | 0.0282 | 0.0263 | 0.0253 |

Figure 10A:
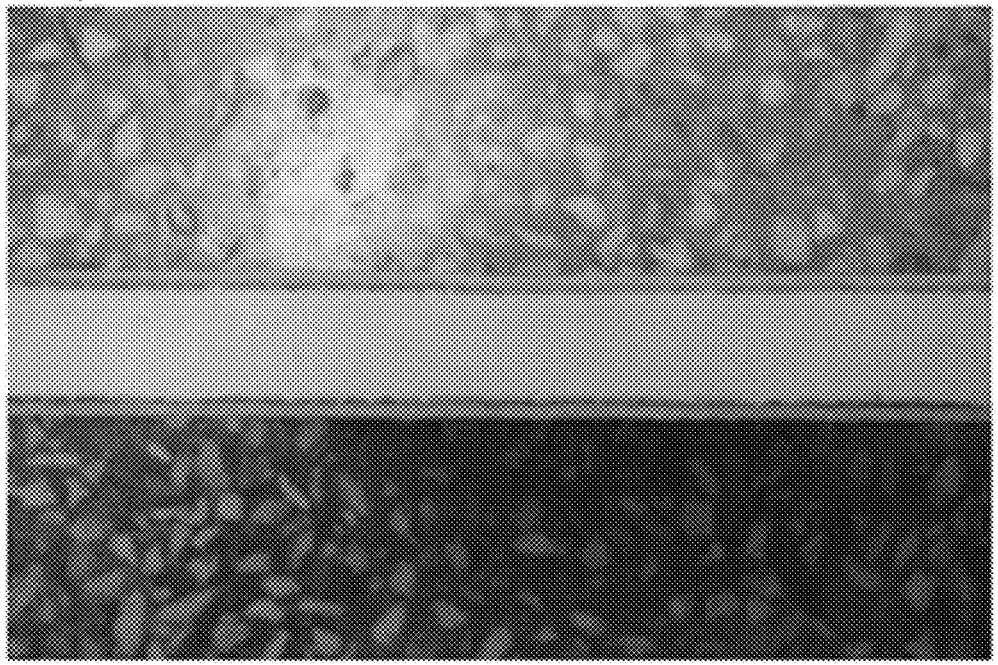
FIGS. 10a through 10e are photographs taken to compare the extent of interfacial delamination between core material and surface material after the flexural fatigue resistance evaluation of each panels is made, the panels being manufactured according to examples and comparative examples.
Figure 10B:
Figure 10C:
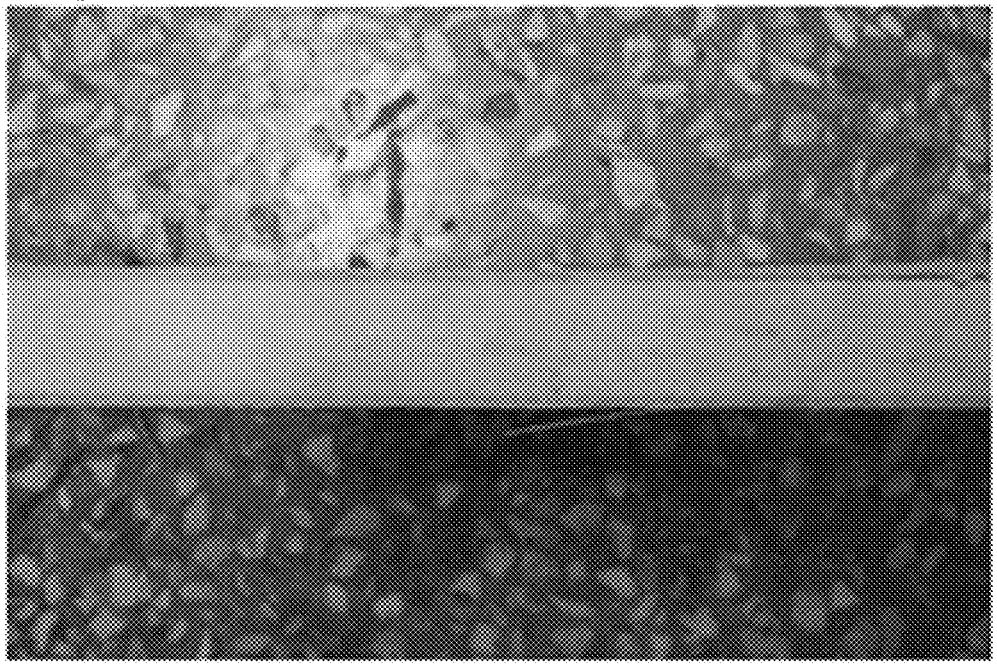
Figure 10D:
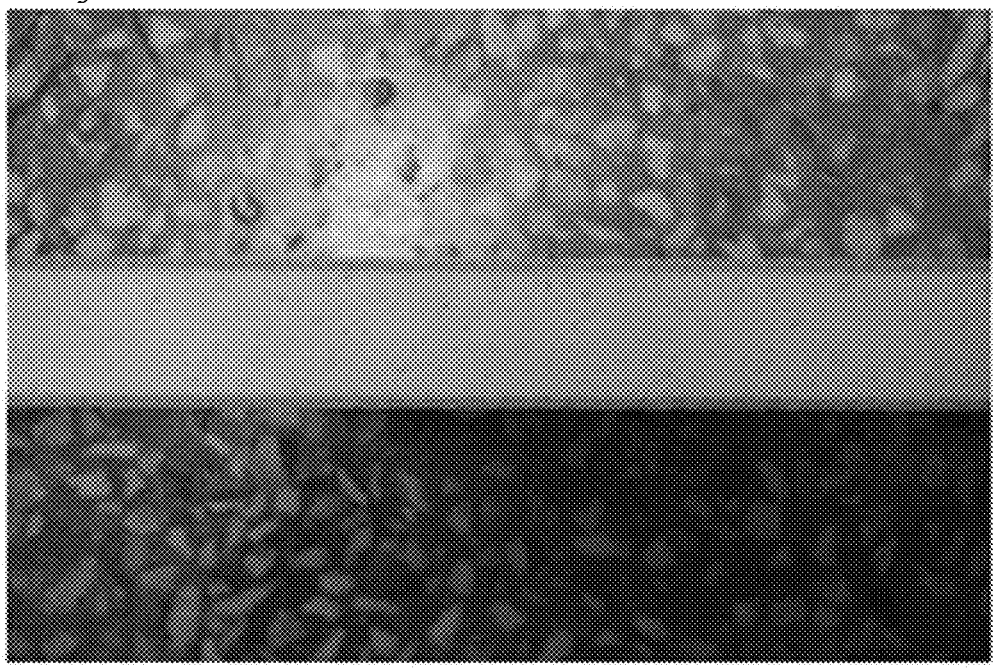
Figure 10E:

According to the results of evaluation of physical properties, it can be demonstrated that although example and comparative examples 1~4 have the same thickness, in terms of the compressive strength and the flexural maximum load value, the example manufactured according to the present invention is superior in comparison with comparative examples 1, 3, and 4. Referring to FIG. 10a through FIG. 10e, whereas no changes in the shape of core material have been observed in example even under flexural load of 514.8 kgf (FIG. 10a), a fractured shape of core material can be seen in comparative example 1 under the load of 469.8 kgf (FIG. 10b), and also interfacial delamination between surface material and core material can be observed in comparative example 2 under flexural load of 503.8 kgf (FIG. 10c).

Especially, a vehicle sandwich structure manufactured according to example of the present invention, in terms of flexural fatigue resistance, has an excellent performance of 53 folds or more in comparison with comparative example 1 which is the conventional vehicle sandwich structure to which Al Honeycomb core is applied as core material, and after longitudinally slicing a foamed resin article, it is confirmed that flexural fatigue resistance is greatly improved by more than 2 folds in comparison with comparative example 2 whereby a glass fiber is not exposed.

Figure 11A:
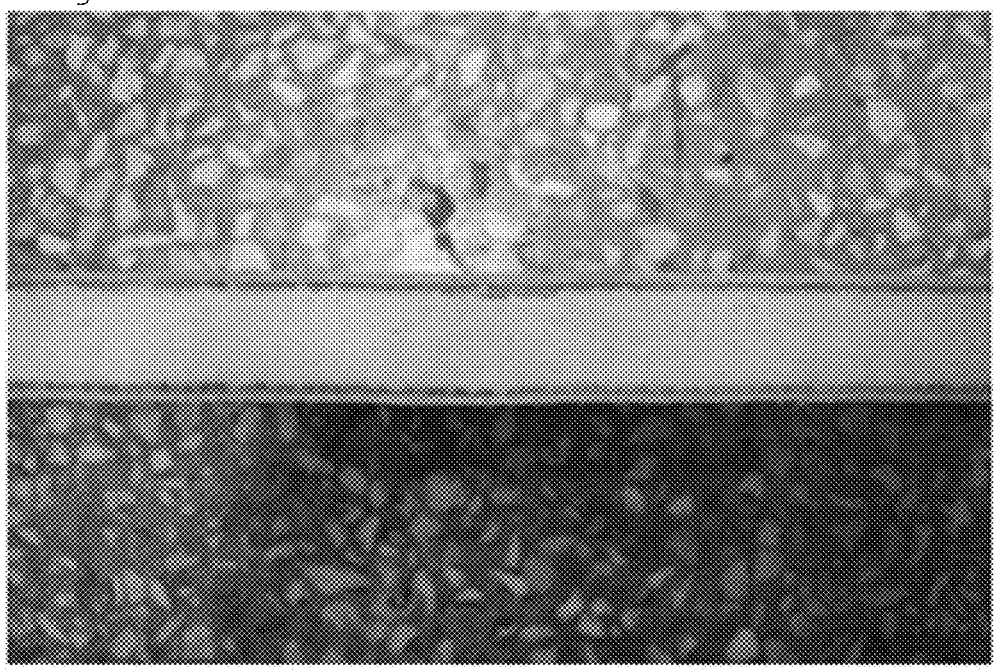
FIGS. 11a through 11c are photographs taken to compare fractured shapes of panels after the flexural fatigue resistance evaluation of each panel is made, the panels being manufactured according to examples and comparative examples.
Figure 11B:
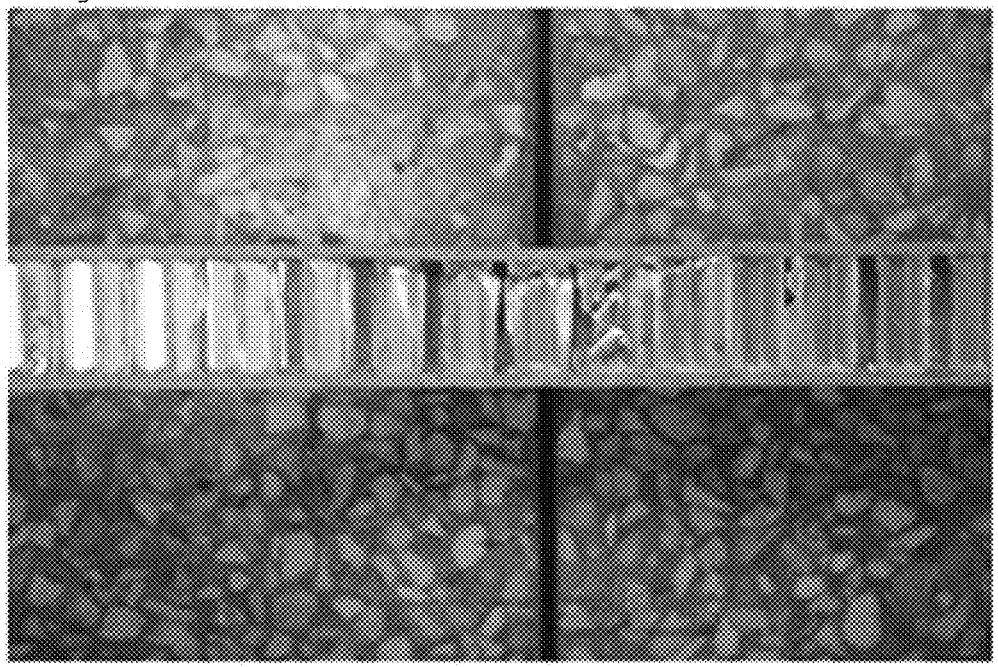
Figure 11C:
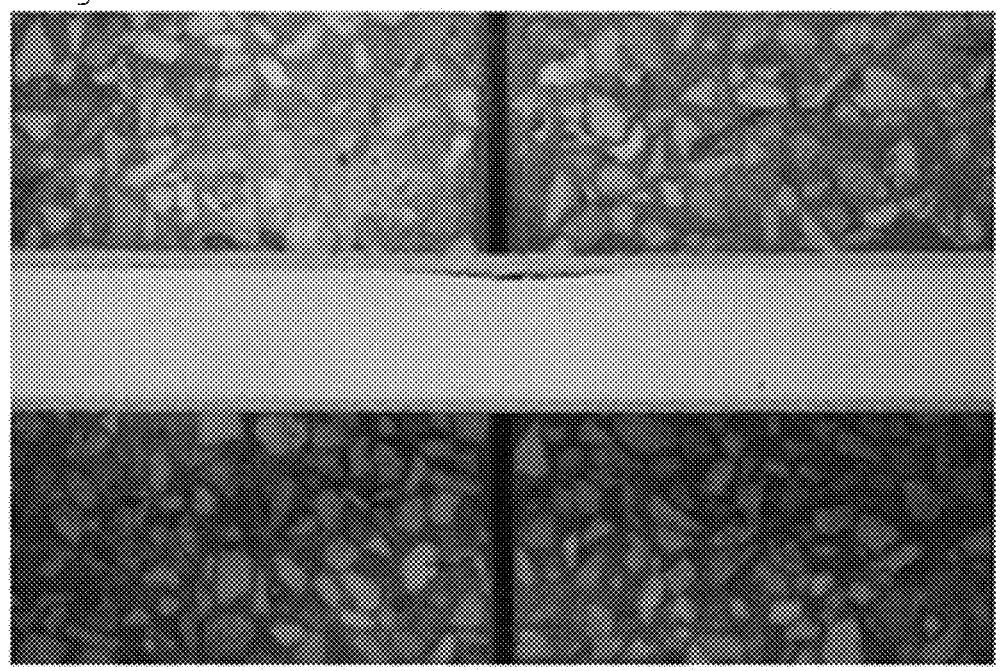

Referring to FIG. 11a through FIG. 11c, under the stress of 3 Hz, 423 kgf, although example receives a load of 107,587 cycles and stops when core material is partially fractured (FIG. 11a), comparative example 1 receives a load of 1,999 cycles and core material is fractured (FIG. 11b), and comparative example 2 receives a load of 46,926 cycles and undergoes not only interfacial delamination between surface material and core material but also fracture of core material can be observed (FIG. 11c). Flexural fatigue resistances of comparative example 3 and comparative example 4 are not evaluated, because fracture occurred before the load was reached.

In case of heat insulation, a vehicle sandwich structure that is manufactured according to example of the present invention, is superior by about 20 folds as compared to comparative example 1, which is the conventional vehicle sandwich structure to which Al Honeycomb core is applied as core material, and has similar heat insulation, in comparison with the rest of the comparative examples.

The present invention as described above is merely exemplary, and for a person having ordinary skills in the art to which this invention pertains, may well understand that various modifications and other equivalent examples are possibly derived therefrom. Accordingly, it will be well construed that the present invention is not limited only to the forms described in said detailed description of the preferred embodiments. Therefore, the true technical protection scope of the present invention is defined by the technical idea of

DESCRIPTION OF THE CODES

1: Vehicle structure
10: Glass continuous strand mat
11: Glass fiber
20: Foamed resin
21: Foamed resin article
30: Binding layer between core material and surface material
40: Surface material
B: Rotary brush
M1: molding

What is claimed is:

1. A manufacturing method for a vehicle sandwich structure, comprises the steps of:
    providing a large number of glass fibers in a continuous strand mat on a mold;
    spraying foamed resin onto the large number of said glass fibers;
    producing a foamed resin article wherein the glass fibers are integrated by foaming said foamed resin such that more than 70% of all glass fibers are at an angle of between above 45° and below 90° relative to a longitudinal axis of a sliced foamed resin article;
    slicing said foamed resin article longitudinally so as to give fixed thicknesses forming said sliced foamed resin article;
    removing the foamed resin from an end portion of the sliced foamed resin article by undergoing physical or chemical treatments at one or both ends of said sliced foamed resin article; and
    undergoing an integrated molding process of said sliced foamed resin article wherein glass fiber is exposed (core material) and a fiber-reinforced composite layer (surface material), so that the fiber-reinforced composite layer is impregnated with the glass fiber which is exposed on said sliced foamed resin article.

2. The manufacturing method for a vehicle sandwich structure according to claim 1, wherein
    the foamed resin used for manufacture of said foamed resin article, is foamed resin selected from the group consisting of a polyurethane resin, a polyisocyanurate resin, a polystyrene resin, a polyethylene resin and a phenolic resin and combinations thereof.

3. The manufacturing method for a vehicle sandwich structure according to claim 2 wherein glass fibers in the form of at least one of a chopped strand mat, a bulky mat, a weaving fabric, and a uni-directional fabric are also provided prior to spraying the foamed resin.

4. The manufacturing method for a vehicle sandwich structure according to claim 1, wherein the physical treatment for removing the foamed resin of one or both ends of said sliced foamed resin article being one type of method selected from the group consisting of a method of adjusting the extent of the cut using cutting devices, and a method of using a brush or a chisel.

5. The manufacturing method for a vehicle sandwich structure according to claim 1, wherein the chemical treatment for removing the foamed resin of one or both ends of said sliced foamed resin article undergoing treatments is carried with one or more organic chemical solvents selected from the group consisting of a hydrocarbon-based, a halogenated hydrocarbon-based, an alcohol-based, an aldehyde-based, an ether-based, an ester-based, a ketone-based, and a glycol ether-based compound.

6. The manufacturing method for a vehicle sandwich structure according to claim 1, wherein the integrated molding process is any one method selected from the group consisting of a method of binding with the use of a binder between a foamed resin article in which glass fiber is exposed and a fiber-reinforced composite layer, and a method of infusing a synthetic resin by laminating a fiber-reinforced composite layer to a foamed resin article in which the glass fiber is exposed.

7. The manufacturing method for a vehicle sandwich structure according to claim 6, wherein:
    the method of infusing the synthetic resin by laminating a fiber-reinforced composite layer (surface material) to a foamed resin article in which the glass fiber is exposed (core material) is more than one or two types of method selected from the group consisting of a hand lay-up, a resin transfer molding, an infusion molding, an autoclave molding, a vacuum bag molding, and a press compression molding; and
    said synthetic resin for integrated molding is more than one or two types of resin selected from the group consisting of an unsaturated polyester resin, a vinyl ester resin, an epoxy resin, a polyurethane resin, a phenolic resin, a polyethylene resin, a nylon resin, a polyacetal resin, a polyvinyl chloride resin, a polystyrene resin and an ABS resin.

8. The manufacturing method for a vehicle sandwich structure according to claim 1, whereby the resulting vehicle sandwich structure has a flexural fatigue resistance of more than 100,000 cycles according to ASTM 393 when carried out at 3 Hz and 423 kgf.

* * * * *